(12) United States Patent
Maher et al.

(10) Patent No.: US 10,767,436 B2
(45) Date of Patent: Sep. 8, 2020

(54) CONNECTIONS FOR USE IN HIGH-PRESSURE RISERS AND MAKE-UP EQUIPMENT THEREFOR

(71) Applicant: Trendsetter Vulcan Offshore, Inc., Houston, TX (US)

(72) Inventors: James V. Maher, Houston, TX (US); Daniel McCelvey, Houston, TX (US)

(73) Assignee: TRENDSETTER VULCAN OFFSHORE, INC., Houston, TX (US)

( * ) Notice: Subject to any disclaimer, the term of this patent is extended or adjusted under 35 U.S.C. 154(b) by 0 days.

(21) Appl. No.: 16/467,705

(22) PCT Filed: Dec. 11, 2017

(86) PCT No.: PCT/US2017/065586
§ 371 (c)(1),
(2) Date: Jun. 7, 2019

(87) PCT Pub. No.: WO2018/107156
PCT Pub. Date: Jun. 14, 2018

(65) Prior Publication Data
US 2020/0003015 A1   Jan. 2, 2020

Related U.S. Application Data

(60) Provisional application No. 62/432,403, filed on Dec. 9, 2016.

(51) Int. Cl.
*E21B 33/043* (2006.01)
*E21B 33/035* (2006.01)
(Continued)

(52) U.S. Cl.
CPC ............ *E21B 33/043* (2013.01); *E21B 17/01* (2013.01); *E21B 17/1085* (2013.01);
(Continued)

(58) Field of Classification Search
CPC ...... E21B 17/01; E21B 17/046; E21B 17/085; E21B 19/006; E21B 19/165;
(Continued)

(56) References Cited

U.S. PATENT DOCUMENTS 3,695,364 A  10/1972 Porter
5,474,334 A  12/1995 Eppink
(Continued)

FOREIGN PATENT DOCUMENTS

WO   2015152729 A1   10/2015

OTHER PUBLICATIONS

International Search Report and Written Opinion for parent PCT application PCT/US2017/065586, 12 pages.

*Primary Examiner* — James G Sayre
(74) *Attorney, Agent, or Firm* — Jonathan Pierce; Pierre Campanac; Porter Hedges LLP

(57) ABSTRACT

Hang-off and/or torque 1 features are provided on the pipes and/or the connections of a high-pressure riser. The hang-off features may be useful to support the weight of the full length of the riser. Accordingly, the hang-off may be done directly in the middle of the connection, where the strength is the greatest. Also, by using the torque features, it is possible to accommodate large torque values. Accordingly, a large torque resistance may be provided while an upper pipe is being made up. A make-up tool taking advantage of the hang-off and/or torque features permits assembling the high-pressure riser more automatically and with less manual intensive labor.

24 Claims, 4 Drawing Sheets

(51) Int. Cl.

| | |
|---|---|
| *E21B 33/06* | (2006.01) |
| *E21B 17/01* | (2006.01) |
| *E21B 17/08* | (2006.01) |
| *E21B 19/00* | (2006.01) |
| *E21B 33/064* | (2006.01) |
| *E21B 17/046* | (2006.01) |
| *E21B 19/16* | (2006.01) |
| *E21B 33/038* | (2006.01) |
| *F16L 37/08* | (2006.01) |
| *E21B 17/10* | (2006.01) |

(52) U.S. Cl.
CPC .......... *E21B 19/006* (2013.01); *E21B 33/035* (2013.01); *E21B 33/062* (2013.01); *E21B 33/064* (2013.01); *E21B 17/046* (2013.01); *E21B 19/165* (2013.01); *E21B 33/038* (2013.01); *F16L 37/08* (2013.01)

(58) Field of Classification Search
CPC .... E21B 33/035; E21B 33/038; E21B 33/043; E21B 33/062; E21B 33/064; F16L 37/08
See application file for complete search history.

(56) References Cited

U.S. PATENT DOCUMENTS

| | | |
|---|---|---|
| 5,634,671 A | 6/1997 | Watkins |
| 2007/0252387 A1 | 11/2007 | Beard et al. |
| 2010/0314865 A1 | 12/2010 | Hatton et al. |
| 2016/0237758 A1* | 8/2016 | Whitefield .............. E21B 17/01 |
| 2016/0258562 A1* | 9/2016 | Bjoerneklett ......... E21B 17/085 |
| 2018/0051523 A1* | 2/2018 | Maher ................... E21B 17/085 |
| 2020/0025318 A1* | 1/2020 | Mitchell ............... F16L 15/004 |

\* cited by examiner

CONNECTIONS FOR USE IN HIGH-PRESSURE RISERS AND MAKE-UP EQUIPMENT THEREFOR

BACKGROUND

This disclosure relates generally to connections for high-pressure risers, and to methods and apparatus for assembling the connections for high-pressure risers.

When a subsea well is controlled using a surface Blow-Out Preventer ("BOP") instead of a subsea BOP located on the seafloor, the well control activities are mainly conducted at the sea surface. Thus, using a surface BOP typically requires a high-pressure riser for providing a pressure barrier between the subsea shutoff, usually a Mudline Closure Device ("MCD"), and the surface BOP. An example of available technology to implement a high-pressure riser is to use the type of pipes that have more commonly been used for downhole casing. Also, threaded and coupled ("T&C") connectors may be preferred for joining the pipes of the high-pressure riser. Indeed, the standard design of T&C connectors keeps the load path as close as possible to the outer diameter of the pipes, which is beneficial with the high pressures and associated large end cap forces possibly encountered in a high-pressure riser. Although the standard design of T&C connectors that are commonly employed for joining casing pipes may work adequately in a high-pressure riser, there are some important operational and technical issues that could be addressed to improve their assembly when they are used in a high-pressure riser.

When a casing is made-up of pipes with T&C connectors, the assembly systems consist of slips and tongs. In the down position, the slips grab onto the lower pipe assembly from all angles that can be engaged. In the up position, the slips release the lower pipe assembly. The slips are not capable of supporting the lower pipe assembly on the T&C connectors due to their profile that is preferably slim for a more even load distribution on the threads. Thus, the slips need to grab on the lower pipe assembly, which has a T&C connector already installed on it and facing up. The slips consist of essentially friction surfaces, which are long enough to allow sufficient friction to support the weight of the full length of the lower pipe assembly, in some cases up to 12,000 feet, which is hanging below the slips. The tongs also include a section that is similar to the slips (sometimes called the upper slips). The upper slips grab the upper pipe to be joined to the lower pipe assembly. The upper slips are attached to a portion of the tongs that will rotate when driven by the torque provided on the tongs.

This assembly method is manually highly intensive and requires a dedicated and trained crew to be executed. Further, when the make-up and break-out torque is high, the slips that are commonly used suffer from significant limitations. Slip tooth bite creates a significant distortion on the pipes, even if non-marking dies are used. This distortion makes use of coatings difficult, makes it difficult to achieve the level of corrosion protection that may be desired, and potentially generates fatigue failure. Still further, the area where the slips grab the lower pipe assembly must be bare and cannot have any obstructions. Thus, there are large areas of the pipes making the riser that are prevented from being used for setting buoyancy or other riser attachments. Finally, slips are inherently limited in the amount of torque they can provide.

There is a need for an alternate system that provides more torque capacity, and/or can hang-off the lower pipe assembly more efficiently. The assembly of the riser can preferably be done more automatically with less manual intensive labor.

BRIEF SUMMARY OF THE DISCLOSURE

The disclosure describes a high-pressure riser.

The high-pressure riser comprises a plurality of pipes. Each of the plurality of pipes has a first end, a second end that is opposite of the first end, and an outer surface. Each of the plurality of pipes includes a first threaded pin located at the first end, a first slotted area located on the outer surface adjacent to the first threaded pin, and a second threaded pin located at the second end. The first slotted area of each of the plurality of pipes may include longitudinal blind slots equally distributed circumferentially. Each of the plurality of pipes may further include a second slotted area located on the outer surface adjacent to the second threaded pin. The second slotted area of each of the plurality of pipes may also include longitudinal blind slots equally distributed circumferentially.

The high-pressure riser further comprises a plurality of couplings. Each of the plurality of couplings has a first end, a second end that is opposite of the first end, and an outer surface. Each of the plurality of couplings includes a first threaded box located at the first end, and a second threaded box located at the second end. The first threaded pin of each of the plurality of pipes is engageable with the second threaded box of each of the plurality of couplings. The second threaded pin of each of the plurality of pipes is engageable with the first threaded box of each of the plurality of couplings. Each of the plurality of couplings also includes a torque contour located on the outer surface. The torque contour of each of the plurality of couplings may include pairs of radial surfaces. Each of the plurality of couplings may further include a hang-off shoulder located on the outer surface. The hang-off shoulder of each of the plurality of couplings may include a portion of a conical surface.

The high-pressure riser further comprises a first plurality of collars. Each of the first plurality of collars may include at least two bands that are clampable around the first slotted area of each of the plurality of pipes. Each of the first plurality of collars has an inner surface and an outer surface. Each of the first plurality of collars includes a gripping profile located on the inner surface. The gripping profile of each of the first plurality of collars is engageable with the first slotted area of each of the plurality of pipes. The gripping profile of each of the first plurality of collars may include keys sized to engage longitudinal slots of the first slotted area of each of the plurality of pipes. Each of the first plurality of collars also includes a torque contour located on the outer surface. The torque contour of each of the first plurality of collars may include pairs of radial surfaces.

The high-pressure riser may further comprise a second plurality of collars. Each of the second plurality of collars may have an inner surface and an outer surface. Each of the second plurality of collars may include a gripping profile located on the inner surface and a torque contour located on the outer surface. The gripping profile of each of the second plurality of collars may be engageable with the second slotted area of each of the plurality of pipes.

The disclosure also describes a make-up tool for assembling a high-pressure riser, wherein the high-pressure riser includes at least one coupling having a first end, a second end that is opposite of the first end, and an outer surface, wherein the at least one coupling includes a first threaded box located at the first end, a second threaded box located at the second end, and a torque contour located on the outer surface, wherein the high-pressure riser further includes at least one collar having an outer surface, and wherein the at least one collar includes a torque contour located on the outer surface.

The make-up tool comprises a spider having a spider opening. The spider opening includes an inner diameter and a torque profile that aligns with the torque contour of the at least one coupling. The torque profile of the spider opening may include pairs of radial surfaces. The spider opening may further include an inner seat that projects inward from the inner diameter of the spider opening. The inner seat may include a portion of a conical surface.

The make-up tool further comprises a rotatable ring having a ring opening. The ring opening includes an inner diameter and a torque profile that aligns with the torque contour of the at least one collar. The rotatable ring is slidable relative to the spider along a longitudinal axis of the spider opening and the ring opening. The torque profile of the ring opening may include pairs of radial surfaces.

The make-up tool may further comprise at least one electric motor selectively coupled to the rotatable ring and at least one hydraulic motor selectively coupled to the rotatable ring.

The disclosure also describes a method of assembling a high-pressure riser.

The method comprises providing a first pipe, the first pipe having a first end, a second end that is opposite of the first end, and an outer surface, the first pipe including a first threaded pin located at the first end, a first slotted area located on the outer surface adjacent to the first threaded pin, and a second threaded pin located at the second end.

The method further comprises providing a coupling, the coupling having a first end, a second end that is opposite of the first end, and an outer surface, the coupling including a first threaded box located at the first end, a second threaded box located at the second end, and a torque contour located on the outer surface. The coupling may further include a hang-off shoulder located on the outer surface.

The method further comprises engaging the second threaded pin of the first pipe with the first threaded box of the coupling.

The method further comprises providing a second pipe, the second pipe having a first end, a second end that is opposite of the first end, and an outer surface, the second pipe including a first threaded pin located at the first end, a first slotted area located on the outer surface adjacent to the first threaded pin, and a second threaded pin located at the second end.

The method further comprises providing a collar, the collar having an inner surface and an outer surface, the collar including a gripping profile located on the inner surface, and a torque contour located on the outer surface. The collar may include at least two bands.

The method further comprises engaging the gripping profile of the collar with the first slotted area of the second pipe. Engaging the gripping profile of the collar with the first slotted area of the second pipe may comprise clamping the at least two bands of the collar around the first slotted area of the second pipe.

The method further comprises providing a make-up tool including a spider having a spider opening, the spider opening including an inner diameter and a torque profile that aligns with the torque contour of the coupling, the make-up tool further including a rotatable ring having a ring opening, the ring opening including an inner diameter and a torque profile that aligns with the torque contour of the collar. The spider opening may further include an inner seat that opposes the hang-off shoulder of the collar.

The method may comprise engaging the hang-off shoulder of the collar with the inner seat of the spider to support the first pipe. The method further comprises preventing rotation of the collar by engaging the torque profile of the spider with the torque contour of the coupling.

The method further comprises rotating the second pipe by engaging the torque profile of the rotatable ring with the torque contour of the collar, applying a torque to the rotatable ring, transmitting the torque from the torque profile of the rotatable ring to the torque contour of the collar, and transmitting the torque from the gripping profile of the collar to the first slotted area of the second pipe. The method may comprise sliding the rotatable ring of the make-up tool relative to the spider to engage the torque profile of the rotatable ring with the torque contour of the collar.

The method comprises engaging the first threaded pin of the second pipe with the second threaded box of the coupling.

BRIEF DESCRIPTION OF THE DRAWINGS

For a more detailed description of the embodiments of the disclosure, reference will now be made to the accompanying drawings, wherein.

DETAILED DESCRIPTION

Figure 1:
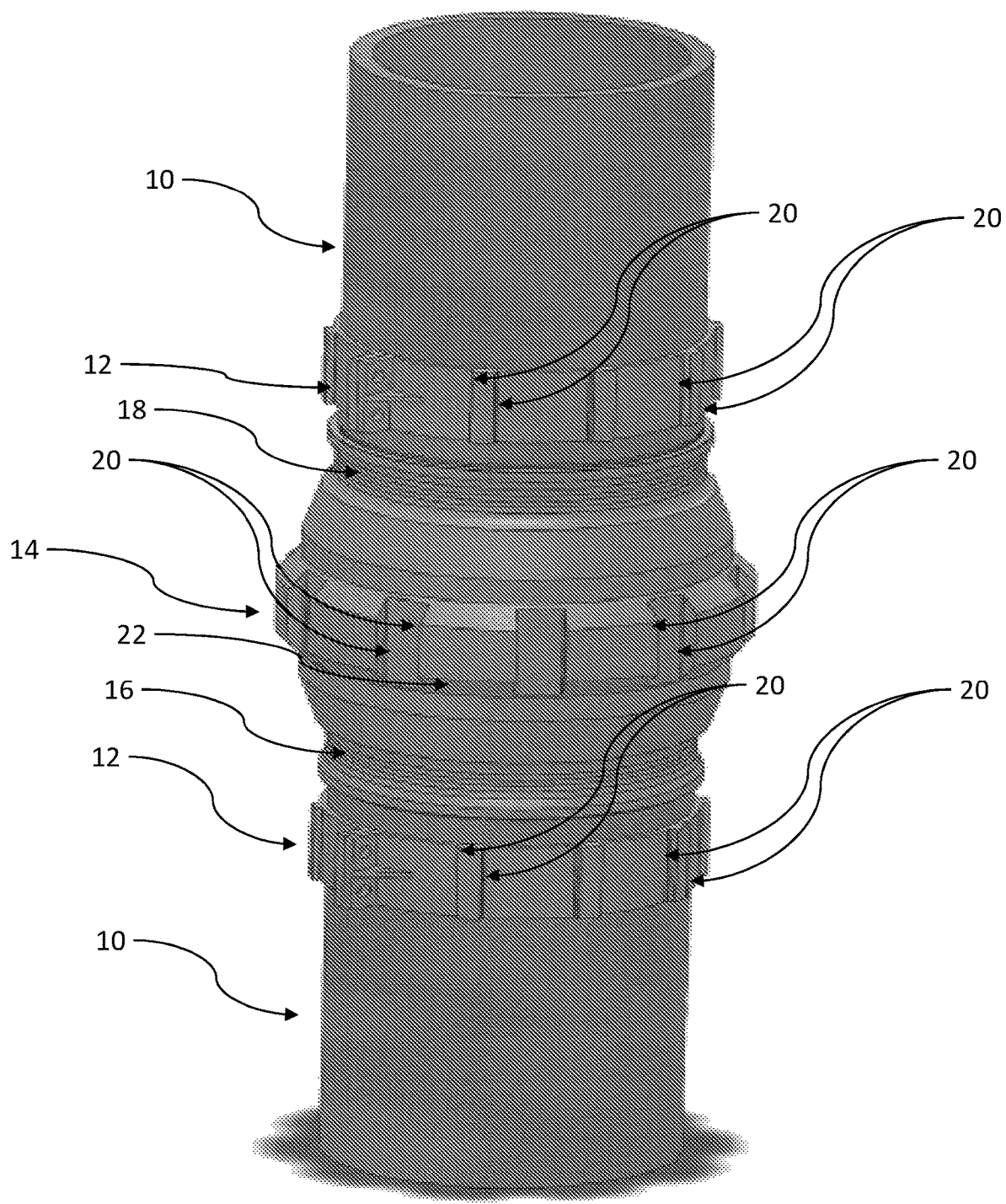
FIG. 1 is a perspective view of a connection for a high-pressure riser including an upper pipe, an upper collar, a coupling, a lower pipe, and a lower collar.

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Finally, the exemplary embodiments presented below may be combined in any combination of ways, i.e., any element from one exemplary embodiment may be used in any other exemplary embodiment, without departing from the scope of the disclosure.

All numerical values in this disclosure may be exact or approximate values unless otherwise specifically stated. Accordingly, various embodiments of the disclosure may deviate from the numbers, values, and ranges disclosed herein without departing from the intended scope. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

In the following discussion and in the claims, the terms "including" and "comprising" are used in an open-ended fashion, and thus should be interpreted to mean "including, but not limited to." Furthermore, as it is used in the claims or specification, the term "or" is intended to encompass both exclusive and inclusive cases, i.e., "A or B" is intended to be synonymous with "at least one of A and B," unless otherwise expressly specified herein.

Certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function.

The main benefit of using slips and tongs for making up T&C connectors is that the slips can grab onto the pipes without requiring any additional structure extending from the outer diameter of the pipes. While this benefit may be important for a downhole casing (and/or an inner riser) due to the fact that downhole casing must fit within a constrained inner diameter, for assembling a high-pressure drilling riser, however, there is no such constraint, and better methods for supporting, providing torquing capability and assembling the pipes are therefore possible. With the elimination of the constraint of fitting in an inner diameter, hang-off and/or torque features can be provided on the pipes and/or the connection. The hang-off features may be useful to support the weight of the full length of the riser. Accordingly, the hang-off may be done directly in the middle of the connection, where the strength is the greatest. Also, by using the torque features, it is possible to accommodate large torque values. Accordingly, a large torque resistance may be provided while the upper pipe is being made up.

FIG. 1 illustrates a connection of a high-pressure riser. The connection includes two pipes 10, each pipe having lower threaded pin 18 (only shown for the upper pipe) and an upper threaded pin 16 (only shown for the lower pipe). The connection includes a coupling 14 having an upper threaded box coupled to the lower threaded pin 18 and a lower threaded box coupled to the upper threaded pin 16. The coupling 14 includes a torque contour including pairs of radial surfaces 20. The coupling 14 also includes a portion of a conical surface 22 that forms a hang-off shoulder. The connection also includes collars 12 having a torque contour including pairs of radial surfaces 20.

Figure 1A:
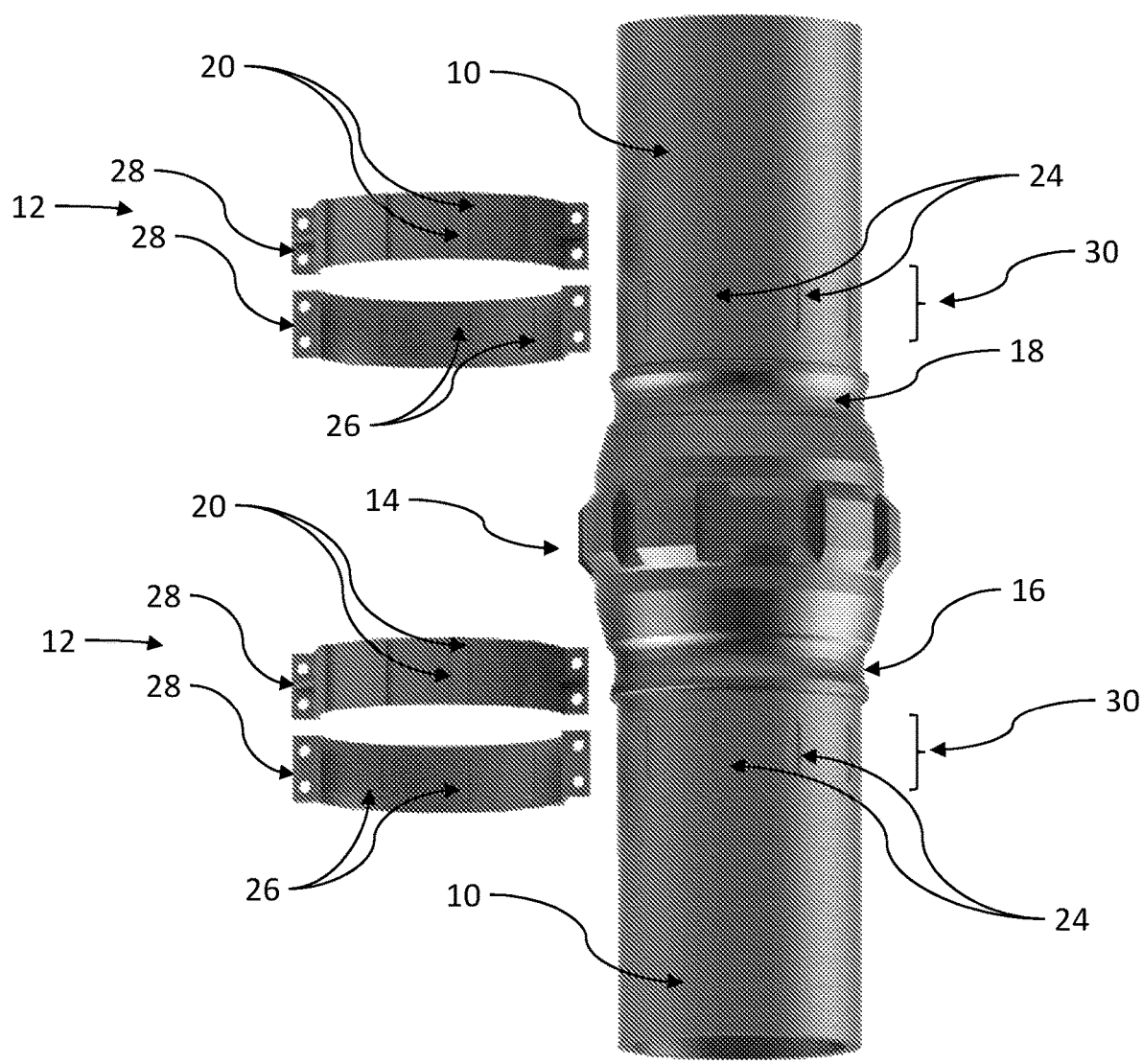
FIG. 1A is an exploded view of the connection shown in FIG. 1 showing the upper collar separated from the upper pipe, and the lower collar separated from the lower pipe.

FIG. 1A illustrates slotted areas 30. The slotted areas 30 include longitudinal blind slots 24, which may be equally distributed circumferentially. The collars 12 include at least two bands 28 that can be clamped on the slotted areas 30. The collars 12 have a gripping profile that includes keys 26.

Figure 1B:
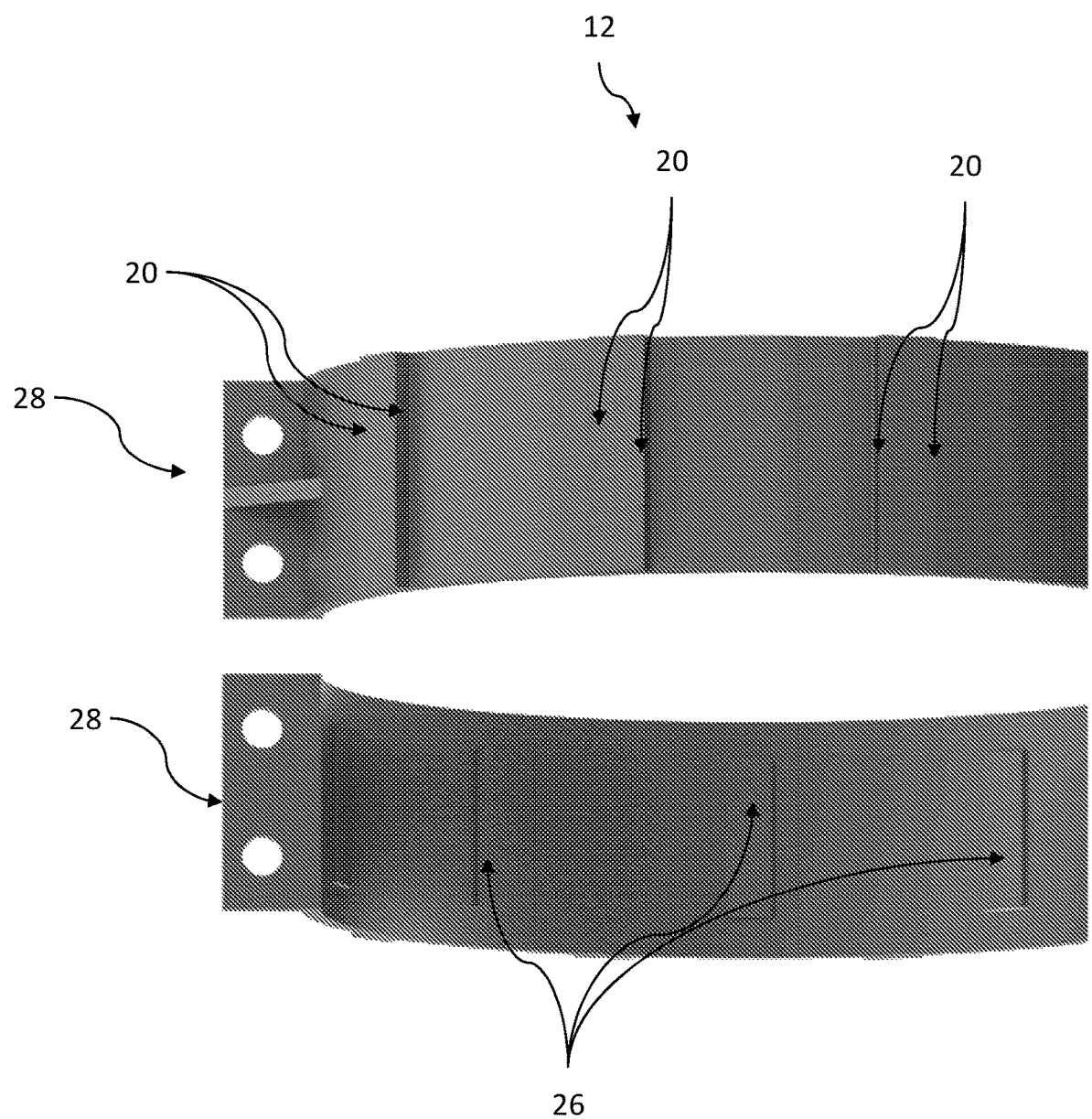
FIG. 1B is an enlarged portion of FIG. 1A showing the two bands of the upper collar or the lower collar.

FIG. 1B illustrates an enlarged portion of one of the collars 12 shown in FIG. 1A.

Figure 2:
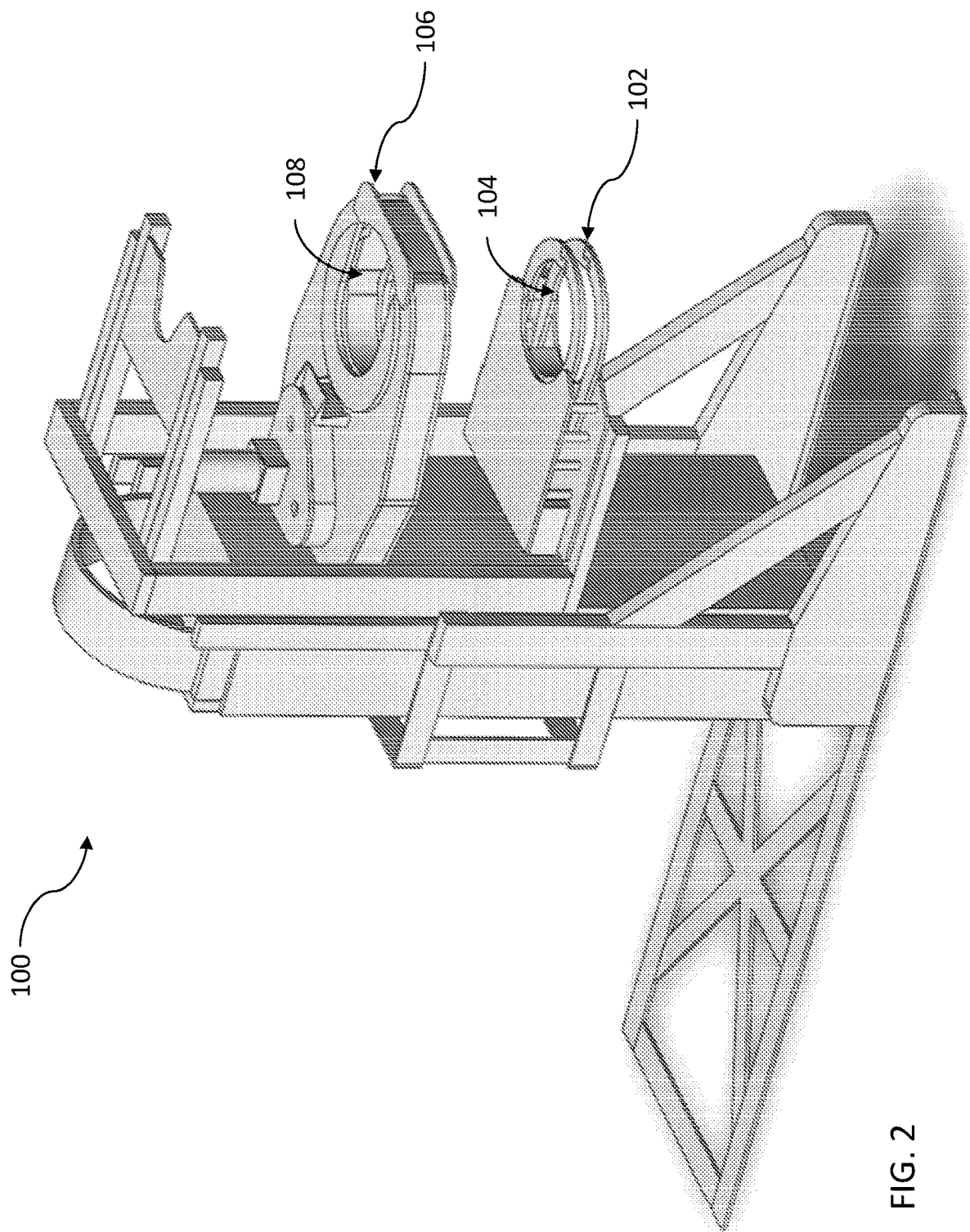
FIG. 2 is a perspective view of a make-up tool that may be used for assembling or disassembling the connection shown in FIG. 1.

FIG. 2 illustrates a make-up tool 100. The make-up tool 100 includes a spider 102. A spider opening 104 has an inner diameter and a torque profile that aligns with the torque contour of the coupling 14 shown in FIGS. 1 and 1A. The spider opening 104 has an inner seat that supports the hang-off shoulder of the coupling 14 shown in FIGS. 1 and 1A. The make-up tool 100 includes a rotatable ring 106. A ring opening 108 has an inner diameter and a torque profile that aligns with the torque contour of one of the collars 12 (i.e., the collar clamped on the upper pipe) shown in FIGS. 1, 1A and 1B.

Couplings

A coupling stock may be made using the same procedures that are used for manufacturing the pipes, albeit with larger outer diameter and wall thickness to provide the ability to machine the torque contour into the coupling 14 shown in FIGS. 1 and 1A. Using the materials of the coupling stock may have the advantage that these materials are similar to the base pipe material and therefore the connections can have significant structural capacity.

If the base pipe material is desired to make the coupling 14, there may be a manufacturing difficulty for providing the hand-off and/or torque features on the coupling 14. Should this be a concern, it is possible to add these features by machining an interface (e.g., slots) into the coupling 14 and adding the desired hang-off shoulder and/or torque contour as individual components that fit into the interface on the coupling 14.

Another approach to making the couplings is to manufacture them using ring forgings, which have the advantage of being unlimited (for all practical purposes) in terms of thicknesses in comparison to using the base pipe material. A disadvantage of this approach may be that the material grades are more limited—commonly in the 80 KSI range, for materials that are qualified for sour service.

Torque Collars and Riser Pipes

It may be difficult to get a similarly capable torque contour on the lower and upper pipes 10 because it cannot be machined into the base pipe material without losing substantial pressure containment capability. This difficulty can be addressed by machining instead a series of longitudinal blind slots 24 in the pipes 10 that can provide the required lateral torque capacity. A collar 12 as shown in FIGS. 1, 1A and 1B can then be added during the manufacturing stage. The collar 12 can provide the needed torque contour on the outer diameter. The torque contour may be similar to the torque contour that was added for the coupling 12 as described above. The collar 12 can have a gripping profile on the inner diameter that engages the longitudinal blind slots 24.

The coupling method of the collar 12 to the pipes 10 may allow the collar 12 to contribute to the pressure-containment capability of the riser. In effect, the collar 12 can provide structural capability to contribute to the pressure containment. Note that the collar 12 is an integral component of the riser system and is preferably on the pipe in order for it to have the desired pressure containment capabilities. From a safety standpoint, it is recommended that the total depth of the longitudinal blind slots 24 be limited so that the pipe in the slotted area 30 without the collar installed can still have at least the capability to withstand the rated pressure while within the Cased End Yield Pressure.

The profile of the longitudinal blind slots 24 may also be optimized so that they have adequate fatigue life and do not become the limitation to the riser pipe itself. The length of the lands of the longitudinal blind slots 24 is preferably related to the number of slots distributed circumferentially. There can be a transition between the lands of the longitudinal blind slots 24 and the sides of the slots.

Another capability that can easily be added to this collar is to have an elastomeric external seal that will fit between the collar and the coupling. The external seals are compressed as the connection is made up.

Make-Up Equipment

The torque contours located on outer diameter of both the upper and lower collars are very close to each other vertically, and the make-up is therefore much easier to ensure than is a traditional T&C coupling.

The make-up tool 100 shown in FIG. 2 can have openings, each opening having an inner diameter profile that aligns with the outer diameter of the torque contour of the coupling 14 as well as the torque contour of the collars 12. The openings of the make-up tool 100 have gates to be able to deploy around the riser pipe and then close—once the closing of the gates is done, the openings can both slide over torque contour and seat against them.

A series of individual motors, which can be either hydraulic or electrical can then rotate the upper pipe relative to the lower pipe and make up the connection. The first several turns of the make-up can go very rapidly, particularly if the upper and lower pipes 10 have been aligned well. It is therefore helpful to have at least some of the motors be electrical so that the low-torque portion of the make-up operation can be done very rapidly. The other motors can be hydraulic, which are more practical to achieve the very high torque values. The hydraulic motors can initially free-wheel during the low-torque portion of the make-up and the electrical motors can free-wheel during the high-torque portion.

While the disclosure is susceptible to various modifications and alternative forms, specific embodiments thereof are shown by way of example in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. A high-pressure riser, comprising:
    a plurality of pipes, each of the plurality of pipes having a first end, a second end that is opposite of the first end, and an outer surface, each of the plurality of pipes including a first threaded pin located at the first end, a first slotted area located on the outer surface adjacent to the first threaded pin, and a second threaded pin located at the second end;
    one or more couplings, each of the one or more couplings having a first end, a second end that is opposite of the first end, and an outer surface, each of the one or more couplings including a first threaded box located at the first end, a second threaded box located at the second end, and a torque contour located on the outer surface; and
    a first plurality of collars, each of the first plurality of collars having an inner surface and an outer surface, each of the first plurality of collars including a gripping profile located on the inner surface, and a torque contour located on the outer surface,
    wherein the first threaded pin of each of the plurality of pipes is engageable with the second threaded box of each of the one or more couplings,
    wherein the second threaded pin of each of the plurality of pipes is engageable with the first threaded box of each of the one or more couplings, and
    wherein the gripping profile of each of the first plurality of collars is engageable with the first slotted area of each of the plurality of pipes.

2. The high-pressure riser of claim 1, wherein the torque contour of each of the one or more couplings includes pairs of radial surfaces.

3. The high-pressure riser of claim 1 or 2, wherein each of the one or more couplings further includes a hang-off shoulder located on the outer surface.

4. The high-pressure riser of claim 3, wherein the hang-off shoulder of each of the one or more couplings includes a portion of a conical surface.

5. The high-pressure riser of claim 3, wherein the torque contour of each of the first plurality of collars includes pairs of radial surfaces.

6. The high-pressure riser of claim 5, wherein each of the first plurality of collars includes at least two bands clampable around the first slotted area of each of the plurality of pipes.

7. The high-pressure riser of claim 6, wherein the gripping profile of each of the first plurality of collars includes keys sized to engage longitudinal slots of the first slotted area of each of the plurality of pipes.

8. The high-pressure riser of claim 7 wherein the first slotted area of each of the plurality of pipes includes longitudinal blind slots equally distributed circumferentially.

9. The high-pressure riser of claim 6, wherein each of the plurality of pipes further includes a second slotted area located on the outer surface adjacent to the second threaded pin, the high-pressure riser further comprising:
    a second plurality of collars, each of the second plurality of collars having an inner surface and an outer surface, each of the second plurality of collars including a gripping profile located on the inner surface, and a torque contour located on the outer surface,
    wherein the gripping profile of each of the second plurality of collars is engageable with the second slotted area of each of the plurality of pipes.

10. The high-pressure riser of claim 1, wherein the torque contour of each of the first plurality of collars includes pairs of radial surfaces.

11. The high-pressure riser of claim 1, wherein each of the first plurality of collars includes at least two bands clampable around the first slotted area of each of the plurality of pipes.

12. The high-pressure riser of claim 1, wherein the gripping profile of each of the first plurality of collars includes keys sized to engage longitudinal slots of the first slotted area of each of the plurality of pipes.

13. The high-pressure riser of claim 1, wherein the first slotted area of each of the plurality of pipes includes longitudinal blind slots equally distributed circumferentially.

14. The high-pressure riser of claim 1, wherein each of the plurality of pipes further includes a second slotted area located on the outer surface adjacent to the second threaded pin, the high-pressure riser further comprising:
    a second plurality of collars, each of the second plurality of collars having an inner surface and an outer surface, each of the second plurality of collars including a gripping profile located on the inner surface, and a torque contour located on the outer surface,
    wherein the gripping profile of each of the second plurality of collars is engageable with the second slotted area of each of the plurality of pipes.

15. A method of assembling a high-pressure riser, comprising:
    providing a first pipe, the first pipe having a first end, a second end that is opposite of the first end, and an outer surface, the first pipe including a first threaded pin located at the first end, a first slotted area located on the outer surface adjacent to the first threaded pin, and a second threaded pin located at the second end;

providing a coupling, the coupling having a first end, a second end that is opposite of the first end, and an outer surface, the coupling including a first threaded box located at the first end, a second threaded box located at the second end, and a torque contour located on the outer surface;

engaging the second threaded pin of the first pipe with the first threaded box of the coupling;

providing a second pipe, the second pipe having a first end, a second end that is opposite of the first end, and an outer surface, the second pipe including a first threaded pin located at the first end, a first slotted area located on the outer surface adjacent to the first threaded pin, and a second threaded pin located at the second end;

providing a collar, the collar having an inner surface and an outer surface, the collar including a gripping profile located on the inner surface, and a torque contour located on the outer surface;

engaging the gripping profile of the collar with the first slotted area of the second pipe;

providing a make-up tool including a spider having a spider opening, the spider opening including an inner diameter and a torque profile that aligns with the torque contour of the coupling, the make-up tool further including a rotatable ring having a ring opening, the ring opening including an inner diameter and a torque profile that aligns with the torque contour of the collar;

preventing rotation of the collar by engaging the torque profile of the spider with the torque contour of the coupling;

rotating the second pipe by engaging the torque profile of the rotatable ring with the torque contour of the collar, applying a torque to the rotatable ring, transmitting the torque from the torque profile of the rotatable ring to the torque contour of the collar, and transmitting the torque from the gripping profile of the collar to the first slotted area of the second pipe; and engaging the first threaded pin of the second pipe with the second threaded box of the coupling.

16. The method of claim 15, wherein the coupling further includes a hang-off shoulder located on the outer surface, wherein the spider opening further includes an inner seat that opposes the hang-off shoulder of the collar, the method further comprising:

engaging the hang-off shoulder of the collar with the inner seat of the spider to support the first pipe.

17. The method of claim 15 or 16, further comprising sliding the rotatable ring of the make-up tool relative to the spider to engage the torque profile of the rotatable ring with the torque contour of the collar.

18. The method of claim 15, wherein the collar includes at least two bands, and wherein engaging the gripping profile of the collar with the first slotted area of the second pipe comprises clamping the at least two bands around the first slotted area of the second pipe.

19. A make-up tool for assembling a high-pressure riser, the high-pressure riser including at least one coupling having a first end, a second end that is opposite of the first end, and an outer surface, the at least one coupling including a first threaded box located at the first end, a second threaded box located at the second end, and a torque contour located on the outer surface, the high-pressure riser further including at least one collar having an outer surface, the at least one collar including a torque contour located on the outer surface, the make-up tool comprising:

a spider having a spider opening, the spider opening including an inner diameter and a torque profile that aligns with the torque contour of the at least one coupling; and a rotatable ring having a ring opening, the ring opening including an inner diameter and a torque profile that aligns with the torque contour of the at least one collar, wherein the rotatable ring is slidable relative to the spider along a longitudinal axis of the spider opening and the ring opening.

20. The make-up tool of claim 19, wherein the spider opening further includes an inner seat that projects inward from the inner diameter of the spider opening.

21. The make-up tool of claim 20, wherein the inner seat includes a portion of a conical surface.

22. The make-up tool of claim 19, 20 or 21, wherein the torque profile of the spider opening includes pairs of radial surfaces.

23. The make-up tool of claim 19, wherein the torque profile of the ring opening includes pairs of radial surfaces.

24. The make-up tool of claim 19, further comprising at least one electric motor selectively coupled to the rotatable ring and at least one hydraulic motor selectively coupled to the rotatable ring.

* * * * *